United States Patent
Chung et al.

(10) Patent No.: US 12,057,274 B2
(45) Date of Patent: Aug. 6, 2024

(54) PACKAGING STRUCTURES FOR ELECTRONIC ELEMENTS AND SOLID ELECTROLYTIC CAPACITOR ELEMENTS AND METHODS THEREOF

(71) Applicants: Yu-Peng Chung, New Taipei (TW); Chia-Wei Li, Taoyuan, CA (US); Che-Chih Tsao, Hsinchu (TW)

(72) Inventors: Yu-Peng Chung, New Taipei (TW); Chia-Wei Li, Taoyuan, CA (US); Che-Chih Tsao, Hsinchu (TW)

(*) Notice: Subject to any disclaimer, the term of this patent is extended or adjusted under 35 U.S.C. 154(b) by 0 days.

(21) Appl. No.: 17/667,568

(22) Filed: Feb. 9, 2022

(65) Prior Publication Data
US 2023/0253162 A1 Aug. 10, 2023

(51) Int. Cl.
| | | |
|---|---|---|
| H01G 9/008 | (2006.01) | |
| H01G 9/08 | (2006.01) | |
| H01G 9/15 | (2006.01) | |
| H01G 9/26 | (2006.01) | |

(52) U.S. Cl.
CPC ............ *H01G 9/008* (2013.01); *H01G 9/08* (2013.01); *H01G 9/15* (2013.01); H01G 9/26 (2013.01)

(58) Field of Classification Search
None
See application file for complete search history.

(56) References Cited

U.S. PATENT DOCUMENTS

| | | | | |
|---|---|---|---|---|
| 6,238,444 | B1* | 5/2001 | Cadwallader | H01G 9/15 29/25.03 |
| 2008/0247122 | A1* | 10/2008 | Vaisman | H01G 9/15 29/25.03 |
| 2017/0178821 | A1* | 6/2017 | Summey | H01G 9/15 |
| 2020/0303130 | A1* | 9/2020 | Furukawa | H01G 9/048 |

FOREIGN PATENT DOCUMENTS

| | | | | |
|---|---|---|---|---|
| JP | 05259003 | A | * 10/1993 | |
| JP | 09266136 | A | * 10/1997 | H01G 9/012 |
| JP | 2004063543 | A | * 2/2004 | H01G 2/065 |

* cited by examiner

*Primary Examiner* — Eric W Thomas (57) ABSTRACT

This invention describes packaging structures and methods for electronic devices, especially for solid electrolytic capacitor devices. A packaging structure applies at least two protective substrates to sandwich one or multiple capacitor elements stacked together in between with an insulating material surrounding the capacitor elements also in between the protective substrates. Each protective substrate comprises an anodic conductor pad and a cathodic conductor pad. The anodic conductor pad is electrically connected to an external anode terminal, which is in turn electrically connected to the tip face of the anode end of the capacitor element. The cathodic pad is electrically connected to the cathode of the capacitor element as well as to an external cathode terminal. For quantity production, the basic concept includes sandwiching hundreds of capacitor elements in between large thin protective substrates and bonding them to the conductor pads on the protective substrates; then filling in the insulating material by a capillary filling process; then (Continued)

curing the assembly into a first intermediate assembly. A second intermediate assembly is then made by cutting slots over the first intermediate assembly to expose the anodic and cathodic ends of each capacitor device for subsequent metal depositions to make the external terminals.

14 Claims, 10 Drawing Sheets

PACKAGING STRUCTURES FOR ELECTRONIC ELEMENTS AND SOLID ELECTROLYTIC CAPACITOR ELEMENTS AND METHODS THEREOF

CROSS REFERENCE TO RELATED APPLICATIONS

This application claims the benefit of provisional patent application Ser. No. 63/147,735, filed on Feb. 9, 2021, by the present inventors, which is incorporated by reference in its entirety.

BACKGROUND OF THE INVENTION

1. Field of the Invention

The present invention relates to packaging structures and methods of electronic devices, especially of capacitor devices.

2. Background

Solid electrolytic capacitors have the features of low profile, high capacitance, low ESR (equivalent series resistance) and therefore are suitable for surface mount assembly to small form factor high frequency electronic systems.

A solid electrolytic capacitor device is formed by one or more often multiple solid electrolytic capacitor elements stacked together and packaged with an insulating material and electrical contacts are made to connect the electrodes (anodes and cathodes) of the solid electrolytic capacitor elements to the terminals on the outside surface of the package. A solid electrolytic capacitor element (thereafter capacitor element) is typically formed from an aluminium base, which is etched with deep pores over most of its surface for increasing effective surface area. A very thin layer of aluminium oxide formed over the porous surface acts as dielectric interface of the capacitor element. Over the dielectric interface successive layers of conductive polymer (solid electrolyte) and conductive coatings (typically carbon powder and silver particle adhesive) are then deposited to become the cathode. The body of the aluminium base acts as the anode and a small portion at one end of the aluminium base that is not deposited with the conductive polymer and coatings is used for anodic external connection.

Figure 1:
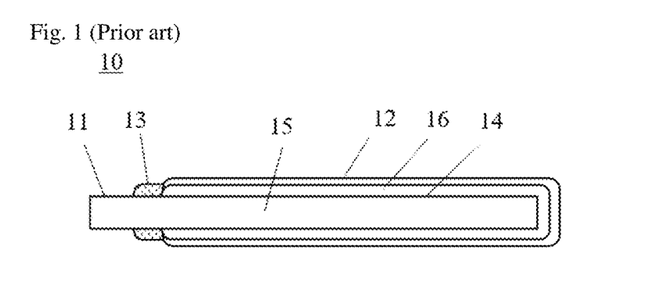
FIG. 1 depicts a cross-sectional view of a typical solid electrolytic capacitor element FIGS. 2 (a) and (b) depict typical solid electrolytic capacitor elements and (c) depicts a typical tantalum electrolytic capacitor element.
Figure 2:
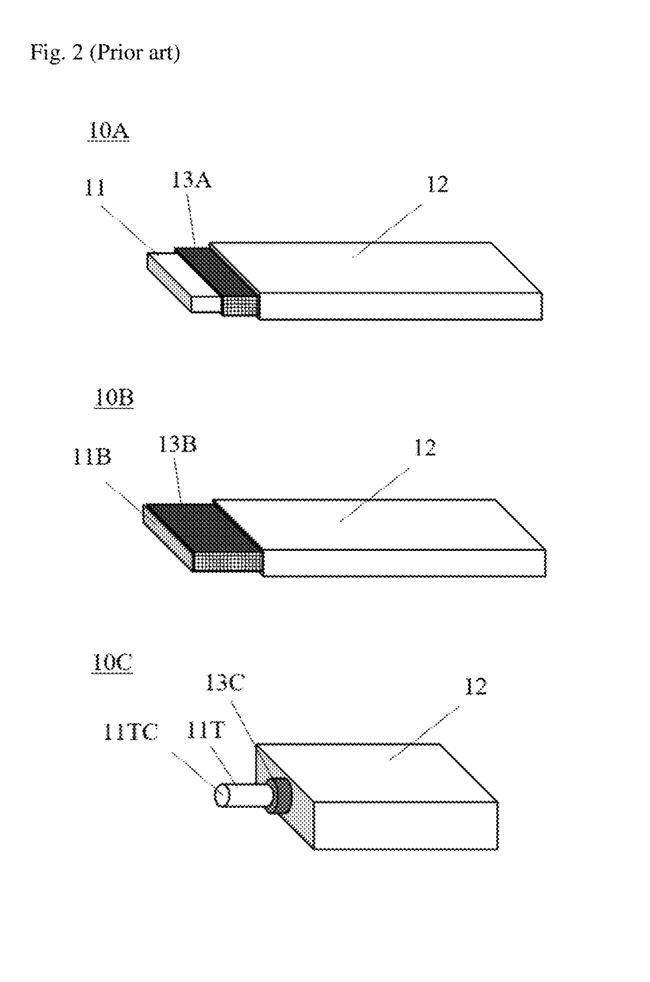

FIG. 1 depicts a cross-sectional view of a typical solid electrolytic capacitor element 10 cut from the anode 11 to the cathode 12. The dielectric interface 14 is on the surface of the aluminium base 15. The conductive polymer layer 16 covers the dielectric interface 14. The conductive coating covers over the conductive polymer layer with the silver adhesive at the outmost surface 12. Thus, in its external view, as depicted in FIG. 2 10A, most of the surface area is covered with the silver adhesive 12 over the cathode layers. The anode 11 is at one end. And a barrier coating 13 is applied between the areas of the anode and the cathode to prevent short circuit between the two areas. The barrier coating can be narrow, as 13A in the case of capacitor element 10A, or can be wide, as 13B in the case of capacitor element 10B, to cover most area of the anode except the tip face 11B of the anode end.

The packaging of a solid electrolytic capacitor device is to enclose one or multiple capacitor elements in an insulating material and electrically connect the anodes and the cathodes to the external terminals. Because the capacitance of a capacitor element resides at the dielectric interface 14, for the aluminium base 15 of a fixed size, the surface area covered by the dielectric interface is preferably maximized. Therefore, exposed area of the anode end is comparatively small. Further, in order to minimize footprint and profile of the packaged capacitor device, it is preferred to make the package envelope as close to the capacitor element as possible.

For above reasons, there are two challenges in minimizing capacitor packaging. Firstly, external terminals are preferred to be placed as close to the anodes and the cathodes as possible and connecting conductors should have minimal sizes. But since the anode area is small, making and maintaining good electrical connection to this small area become a challenge. When multiple capacitor elements are stacked together, to increase total capacitance of the device, this anodic connection issue becomes even more critical because connections generally must be made to the tip faces of the anode ends 11B since those are the only exposed areas available for making electrical contact. Further complicating the situation is that there is always a very thin film of aluminium oxide on the exposed anode surface and tip areas, due to the high activity of aluminium metal. This oxide film not only affects conductivity but also hinders effective electrical bonding to any external terminal.

Secondly, the insulating material wrapping the capacitor elements should be as thin as possible. But conventional packaging process such as molding compound by transfer molding is associated with highly viscous material flow under large pressure. To make thin insulation, the spacing between a mold wall and a capacitor element must be reduced, which increases viscous stress over the capacitor element if the same flow rate is to be maintained. Compression molding reduces pressurized flow but not eliminate it. Sheet compound molding involves high pressure. Because solid electrolytic capacitor elements generally lack good mechanical strength, all these factors make packing thin capacitor without damaging capacitor element or electrode connections difficult.

JP 8 (1996)-273983 A, which is incorporated herein in its entirety by reference, describes a method of forming a metal plating layer on the surface of anode surface of each capacitor element and connecting anodes of multiple stacked capacitor elements to a further plating layer.

U.S. Pat. No. 6,392,869 B2, which is incorporated herein in its entirety by reference, describes a compact packaging for multiple capacitor elements. The capacitor elements are stacked and bonded together by a conductive adhesive on top of a conductor that has an extended part serving as cathode external terminal. The stack with the cathode conductor terminal is then enveloped by an insulating material. The anode end is then polished to reveal the tip faces of the anode ends of the stacked capacitor elements. A zinc substitution process is then applied to remove the aluminium oxide film on the exposed tip faces. A nickel layer is next coated over the tip faces by electroless plating, which is followed by a coating of gold, also by electroless plating. A coating of conductive resin is then applied over the tip faces of the capacitor elements, now already covered with gold and nickel, and the surrounding insulting materials to form an anodic conductive elastic body, that is, the anode terminal. (Referring to FIG. 1B, FIG. 2A, FIG. 2B and corresponding description in U.S. Pat. No. 6,392,869 B2)

U.S. Pat. No. 10,340,092 B2, which is incorporated herein in its entirety by reference, describes another compact packaging for multiple capacitor elements. Similar to the case of U.S. Pat. No. 6,392,869 B2, the capacitor elements are stacked and bonded together by a conductive adhesive on top of a leading conductor layer, which lies on one side of a base substrate and is to be used as cathode. The assembly, including the leading conductor layer, is then enveloped and covered completely by an insulating material by compression molding. Next, the base substrate with assembled capacitor bodies are cut into individual capacitor bodies. The capacitor bodies are then barrel polished so that each capacitor body has it corners and edges rounded and the tip faces of the cathode leading conductor layer and the anode of the capacitor elements exposed. Subsequently, similar to the case of U.S. Pat. No. 6,392,869 B2, a zinc substitution process (or called zincate treatment) is applied to make electrical connection to the anode aluminium metal, which is followed by a nickel electroless plating. However, instead of conductive resin, the anode terminal is made by electroless plating of copper, nickel and tin. (Referring to FIG. 2, FIG. 8 and corresponding description of U.S. Pat. No. 10,340,092 B2)

Despite the above developments, electronic industries and markets continue to demand solid electrolytic capacitors of low profile, low ESR (equivalent series resistance) and high reliability. Due to heat effect of solder reflow during device assembly, cracking or detachment or delamination in micro scale can increase ESR and reduce capacitor reliability. Therefore, better packaging structures and more cost effective manufacturing processes are needed.

BRIEF SUMMARY OF THE INVENTION

This invention includes a new packaging structure that applies two protective substrates to sandwich one or multiple capacitor elements stacked together in between with an insulating material surrounding the capacitor elements also in between the protective substrates. Each protective substrate comprises an anodic conductor pad and a cathodic conductor pad. The anodic conductor pad is electrically connected to an external anode terminal, which is in turn electrically connected to the tip face of the anode end of the capacitor element. The cathodic pad is electrically connected to the cathode of the capacitor element as well as to an external cathode terminal.

For quantity production, the basic concept includes sandwiching hundreds of capacitor elements in between large thin protective substrates and bonding them to the conductor pads on the protective substrates; then filling in the insulating material by a capillary filling process; then curing the assembly into a first intermediate assembly. A second intermediate assembly is then made by cutting slots over the first intermediate assembly to expose the anodic and cathodic ends of each capacitor device for subsequent metal depositions to make the external terminals.

In addition to capacitor elements, the packaging methods and structures are also applicable for other general electronic elements.

In general, the method of the invention can be summarized in the following steps:
(a) Provide a first substrate as a lower substrate, which includes on its upper surface multiple electrically conductive pads at pre-determined positions, each pad pasted with an electrically conductive joining material;
(b) Dispose multiple electronic elements to the pre-determined positions with the joining material covered pads;
(c) Provide a second substrate as an upper substrate, which includes on its lower surface multiple electrically conductive pads at pre-determined positions, each pad pasted with an electrically conductive joining material, and dispose the second substrate over the top of the first substrate such that the multiple electronic elements are disposed in between the upper substrate and the lower substrate and the lower substrate still has an area not covered by the upper substrate, called dispensing area, on its upper surface;
(d) Harden the electrically conductive joining material so that the lower substrate, the upper substrate and the electronic elements in between are joined as a base assembly, which has internal passages that are interconnected and connected to the dispensing area as well;
(e) Fill the internal passages with an insulating material from the dispensing area such that the insulating material encompass all the electronic elements in between the upper and the lower substrates;
(f) Harden the insulating material so that the base assembly and the insulating material are joined together as a first intermediate assembly;
(g) Create multiple slot openings on the first intermediate assembly by machining such that portions of the conductive pads in the upper and the lower substrates are exposed and thereby obtain a second intermediate assembly;
(h) Form an inner metal layer on selected areas on the surface of the second intermediate assembly such that the inner metal layer connects to the conductive pads including the portions exposed in the multiple slot openings and then form external metal layers over the inner metal layer to become external terminals and thereby obtain a third intermediate assembly;
(i) Cut the third intermediate assembly and separate it into multiple individual electronic devices.

BRIEF DESCRIPTION OF THE DRAWINGS

FIG. 10 (a)-(c) depict a preferred process of packaging by protective substrates with conductive pads on surfaces of non-conductive bodies, according to the present invention.

FIG. 11 (a)-(c) depict another preferred process of packaging by protective substrates with conductive pads on surfaces of non-conductive bodies, with a step to further increase the adhesion strength of the anode terminal, according to the present invention.

FIGS. 12 (*a*) and (*b*) depict an example first intermediate assembly according to the present invention.

FIGS. 13 (*a*) and (*b*) depict an example second intermediate assembly according to the present invention.

FIG. 15 (*a*)-(*c*) depict the procedure and major intermediate assemblies in cross-sectional views in quantity production of capacitor devices comprising all-conductor protective substrates, according to the present invention.

FIG. 16 (*a*) depicts an example of intermediate assembly for quantity production of devices of FIG. 16 (*b*) in top view.

FIG. 16 (*b*) depicts an example packaging including metal covering all 5 sides of both ends of the device.

DETAILED DESCRIPTION

Figure 3:
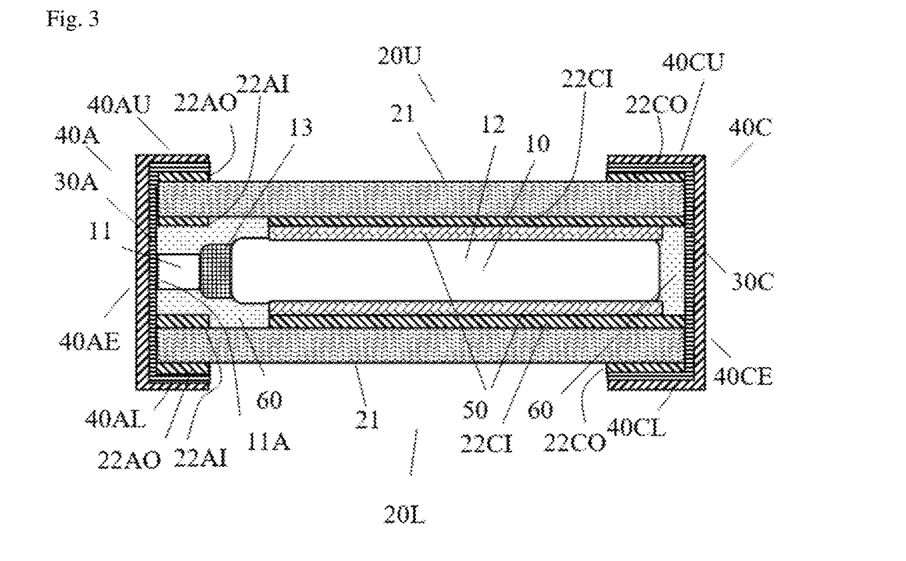
FIG. 3 depicts an example embodiment of the packaging structure containing a single capacitor element in a cross-sectional view according to the present invention.

FIG. 3 depicts the new packaging structure containing a single capacitor element in a cross-sectional view. The single capacitor element 10 is positioned in between an upper protective substrates 20U and a lower protective substrates 20L. The protective substrate of FIG. 3 comprises an electrically insulated substrate body 21 with inner and outer conductive pads on its outer and inner surfaces. Inner cathodic conductor pads 22CI are electrically connected to the cathode of the capacitor element 12 through a layer of conductive joining material 50, such as silver adhesive. The inner cathodic conductor pads 22CI extend to one end of the packaging and is electrically connected to an external cathode terminal 30C and 40C. The tip surface 11A of the anode end 11 of the capacitor element is electrically connected to an external anode terminal 30A and 40A. Thus, external anode terminal 40A and cathode terminal 40C are electrically connected to the anode 11 and cathode 12 of the capacitor element respectively. An insulating material 60 is filled in between the two protective substrates and envelopes the capacitor element.

Figure 4:
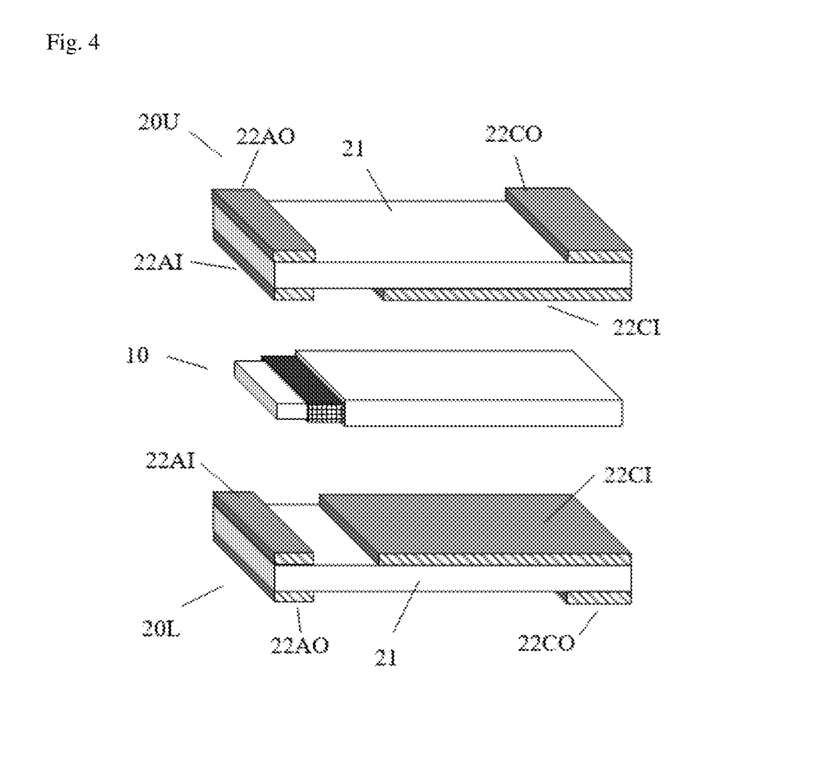
FIG. 4 depicts the packaging of FIG. 3 in exploded (disassembled) view.

FIG. 4 depicts the packaging in exploded (disassembled) view, without the insulating material 60, the joining conductive paste 50 and the external terminals at the two end faces of the packaging.

Figure 5:
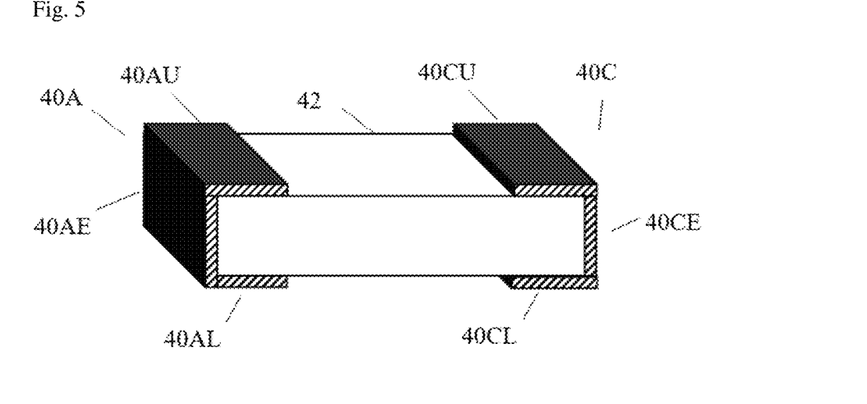
FIG. 5 depicts a perspective view of the packaged capacitor of FIG. 3.

FIG. 5 depicts a perspective view of the packaged capacitor as a thin solid body, with the external terminals 40A and 40C at the two ends of an insulated body 42.

For the purpose of surface mounting assembly and to provide good mechanical strength, the external terminal wraps around an end of the insulated body 42 on at least 3 sides, top 40AU (and 40CU), bottom 40AL (and 40CL) and the end surface 40AE (and 40CE), as depicted in FIG. 5. On the top and the bottom sides, the protective substrates comprise outer conductive pads 22AO and 22CO that are bonded to the substrate bodies 21. These external conductive pads serve as bases for materials of the external terminals to be joined onto. As shown in FIG. 3, the top side of the external terminals 40AU and 40AC is deposited onto the top of the external conductive pads 22AO and 22CO. Similar situations can be seen at the underside.

Figure 6:
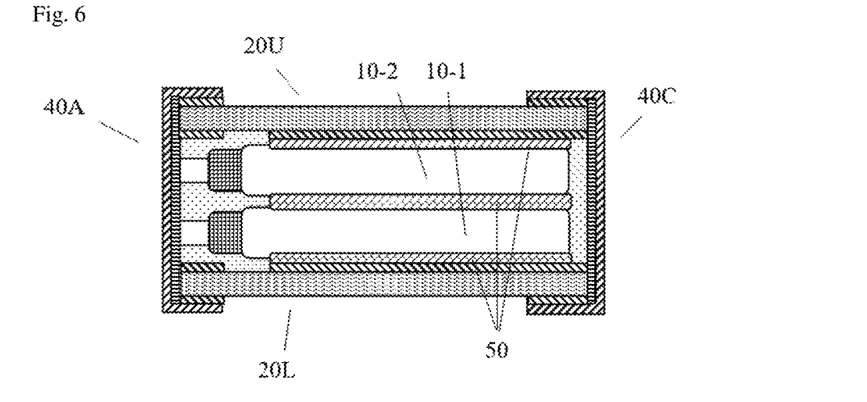
FIG. 6 depicts an example embodiment of the packaging structure containing multiple capacitor elements in a cross-sectional view according to the present invention.

When packaging multiple capacitor elements, the capacitor elements can be stacked and bonded together, e.g., by applying silver adhesive between capacitor elements, into an integral unit first. The integral unit is then packaged in similar way as packaging a single capacitor element. The idea is depicted in FIG. 6, wherein 10-1 and 10-2 represent two capacitor elements.

Figure 7:
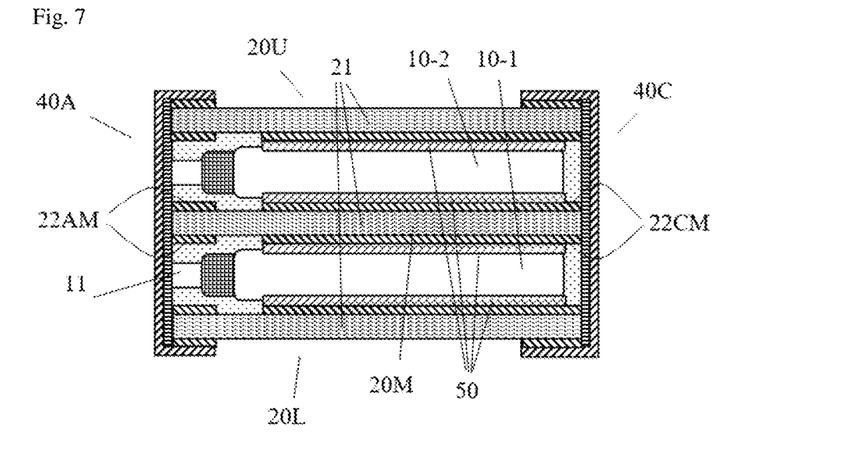
FIG. 7 depicts another example embodiment of the packaging structure containing multiple capacitor elements in a cross-sectional view according to the present invention.

Another packaging arrangement applies a protective substrate in between every two, or in general, among every few adjacent capacitor elements. For example, FIG. 7 depicts a situation wherein a middle protective substrate 20M is placed between two capacitor elements. The cathodic conductive pads 22CM are joined to the cathodes of its two adjacent capacitor elements and to the external cathode terminal 40C. The anodic conductive pads 22AM are joined to the anode 40A. This packaging method appears similar to stacking two packaged single element capacitor together, except that there is only one protective substrate in the middle. The protective substrate placed within a stack of capacitor elements helps increase structural strength of the whole package. Especially, the conductive pads on the anodic end, 22AM, help strengthen the adhesion of the material of the external anode terminal to the anode of the capacitor elements.

The protective substrates can also be in the form of conductive substrates and pads only, that is, without an insulating substrate body. This packaging can further reduce overall device thickness.

Figure 8:
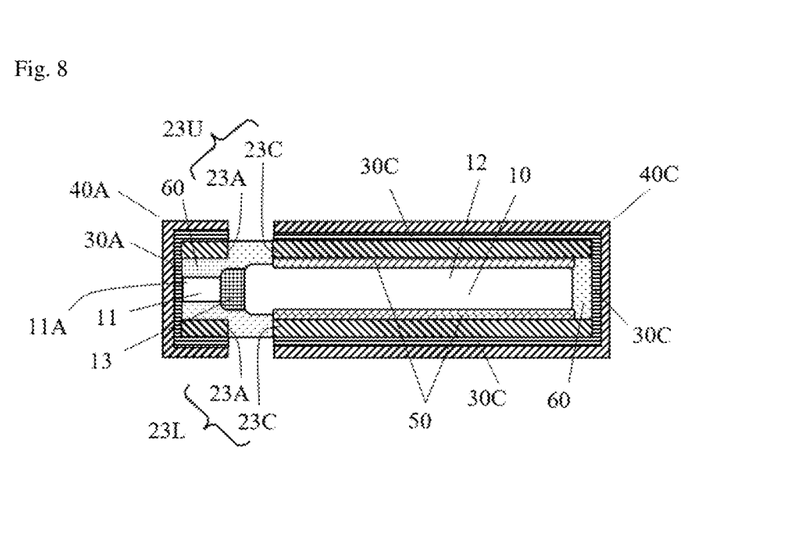
FIG. 8 depicts an example embodiment of the packaging of a single capacitor element by all-conductor protective substrates method according to the present invention.

FIG. 8 depicts a packaging of a single capacitor element by this all-conductor protective substrates method. The upper protective substrate 23U includes anodic conductive pad 23A and cathodic conductive pad 23C. The lower protective substrate 23L is the same. Insulating material 60 is filled into the inner gap of the sandwiched assembly. The cathodic conductor pads 23C are electrically connected to an external cathode terminal 30C and 40C. The tip surface 11A of the anode end 11 of the capacitor element is electrically connected to an external anode terminal 30A and 40A, which also wrap around the anodic end of the device and connect to the anodic conductive pads 23A.

Figure 9:
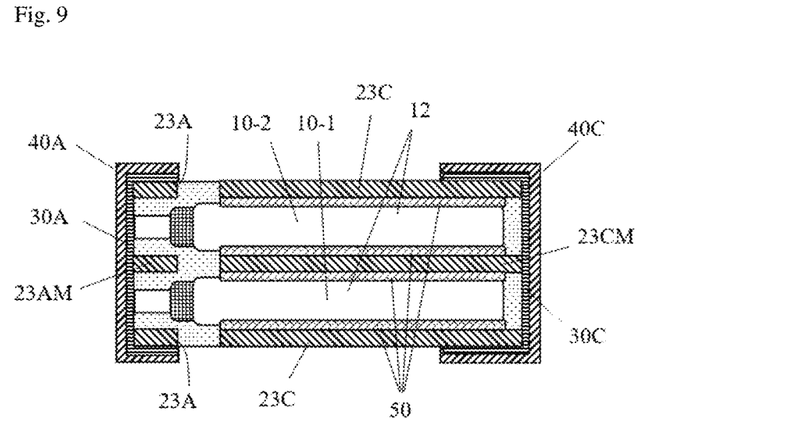
FIG. 9 depicts an example embodiment of the packaging of multiple capacitor elements by all-conductor protective substrates method according to the present invention.

FIG. 9 depicts packaging multiple capacitor elements by this all-conductor protective substrates method, using 2 capacitor elements as example. The packaging is similar to the example of FIG. 8 except that a middle conductive substrate, which includes an anodic pad 23AM and a cathodic pad 23CM, is positioned between the two capacitor elements. The middle anodic pad 23AM is electrically connected to the anode terminal and the cathodic pad 23CM is electrically connected to the cathode terminal as well. The middle conductive pad on the anodic end, 23AM, help strengthen the adhesion of the material of the external anode terminal to the anode of the capacitor elements. However, the middle conductive pads are optional and the two capacitor elements can also be joined directly as in the example of FIG. 6.

In the examples of FIG. 8 and FIG. 9, the anodic conductive pads 23A and the cathodic conductive pads 23C are not connected electrically and the gaps between them are insulated by the filled insulating material 60. In both examples, the anode terminal and the cathode terminal wrap around the ends of the body of the device on at least 3 sides. The cathodic conductive pad 23C has a large area only slightly smaller than the area of the cathode 12 such that the cathodic conductive pads form the main portions of the protective substrates and the cathode is connected to the pads in comparatively large contact area to provide low electric resistance. The cathode terminal (30C and 40C) can cover only a portion of the cathodic conductive pad 23C, as depicted in FIG. 9. If needed, the areas between the anode terminal and the cathode terminal on the upper and lower surfaces can be additionally coated with an insulating material, such as solder mask, to limit the areas of exposed conductors.

In addition to capacitor elements, the packaging methods and structures are also applicable for general electronic elements other than solid electrolytic capacitor elements.

Figure 10:
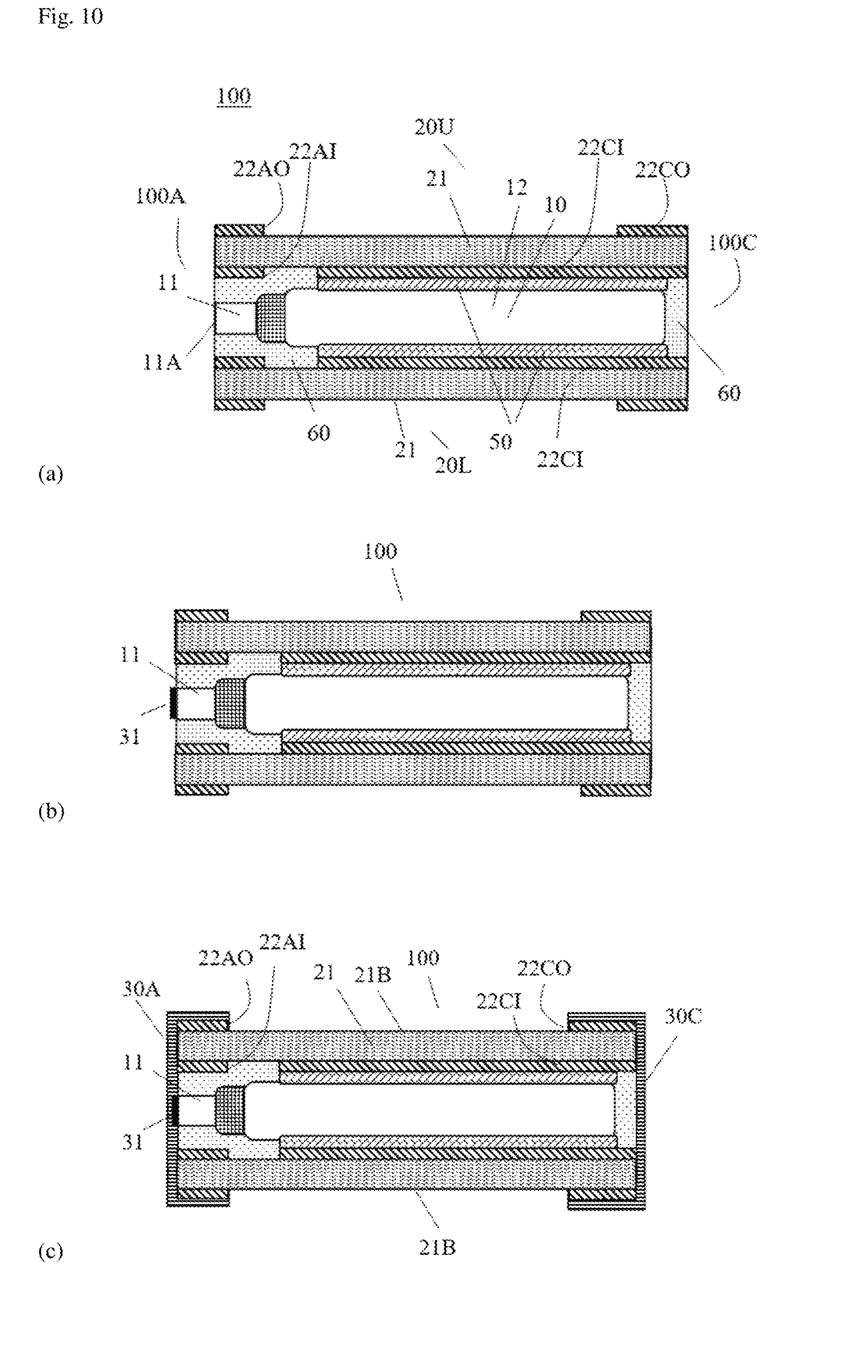

Application Examples (1) Packaging Based on Protective Substrates with Conductive Pads on Surfaces of Non-Conductive Bodies For example, the protective substrate can be made from a PCB (printed circuit board) copper clad board, which has an electrically insulated substrate body 21 of, usually, fiberglass reinforced epoxy with copper clad layers on one or both sides. The copper clad layer can be patterned into copper conductive pads by standard PCB processes. The capacitor element 10 is assembled between the protective substrates, 20U and 20L, by conductive paste 50 and the sandwiched assembly is cured to solidify the conductive paste. Next, an insulating material 60 is filled into the inner gap of the sandwiched assembly. The insulating material can be another epoxy resin material of low viscosity before curing. After curing and solidification of the insulating material, the assembly becomes an intermediate assembly 100 as depicted in FIG. 10(a).

The formation of the external terminals and their electrical connections to the conductive pads on the protective substrates are explained next. The two ends of the intermediate assembly, 100A and 100C, are then machined so that the surfaces are planarized and the edges of the internal conductive pads and the tip face 11A of the anode of the capacitor element are exposed. Next, the tip surface 1A, which is aluminium, is first deposited with an inner metal layer. For example, by applying a zinc substitution process followed by an electroless nickel strike process, a layer of nickel 31 can be deposited onto the tip surface 11A. In this example, in general, the electroless nickel strike does not plate onto the exposed surface of the nonconductive substrate body 21 or the insulating material 60, nor onto the copper pads (22AO, 22CO), because copper is not catalytic to electroless nickel. FIG. 10(b) depicts the situation.

Next, an electroless copper plating is applied. The top and bottom surfaces 21B of the nonconductive part of the protective substrate body is first shielded by plating mask. A pre-treatment, such as palladium seeding, is then applied before the electroless copper plating. This electroless copper 30A and 30C covers the two ends of the intermediate assembly 100, including the inner and outer copper pads (such as 22AI and 22AO) and the nonconductive end surfaces. The copper on the anodic end 30A also makes good connection to the nickel 31 and thus to the anode of the capacitor element as well. At the cathodic end, copper 30C connects to the cathode through connections to the copper pads 22CO and 22C. FIG. 10(c) depicts the situation.

Once the two ends are connected to the capacitor element and are covered with a layer of copper, additional metal layers can be plated to the copper to make external terminals, 40A and 40C as depicted in FIG. 3. Additional metal layers can include electroplating of additional copper to increase metal thickness and strength and a coating of tin.

In general, inner anodic conductive pads 22AI are optional since they themselves do not connect to the anode before the copper plating. However, their existence can help increase the strength of adhesion of the anode terminal after copper plating.

Figure 11:
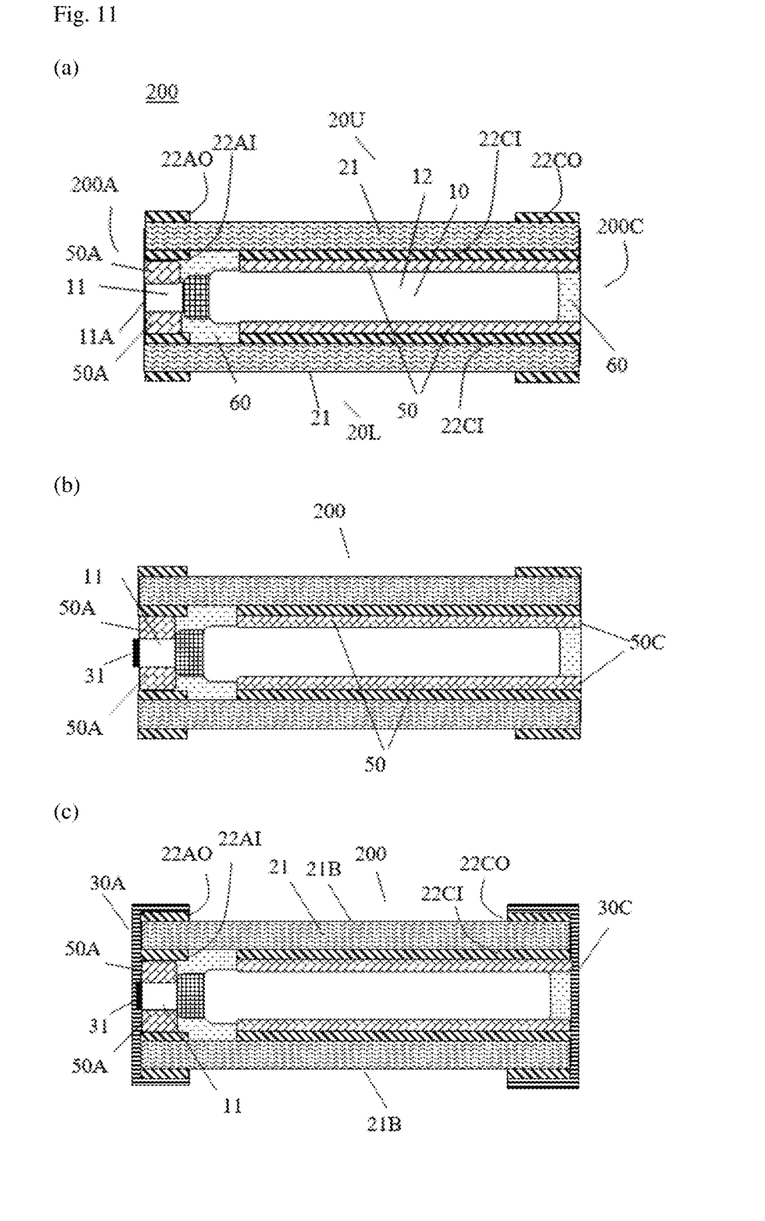

Another variation to further increase the adhesion strength of the anode terminal is to add a conductive paste 50A to join the inner anodic conductive pads 22AI, or the protective substrates if conductive pads 22AI are used, to the upper and lower sides of the anode 11. The conductive paste can be of the same type as the conductive paste 50 used to join the cathode to the inner cathodic conductive pads, such as silver or copper paste. FIG. 11(a) depicts such a structure as an intermediate assembly 200. A metallization process similar to the process applied to the intermediate assembly 100 described previously can be applied to make the anode terminal. In general, when a zinc substitution process followed by an electroless nickel strike process is applied to the anodic end of this intermediate assembly 200, a layer of nickel 31 can be deposited onto the tip surface 11A. However, in general, electroless nickel strike does not plate onto the exposed surface of conductive paste 50A because neither silver nor copper is catalytic to electroless nickel. FIG. 11(b) depicts the situation. An electroless copper plating (with palladium pre-treatment) process followed by an electrolytic copper plating process can then be applied to make the external terminals, as depicted in FIG. 11(c). The anodic conductive paste 50A strengthens anode terminal with its large bonding area and proximity to the anode tip end.

Figure 12:
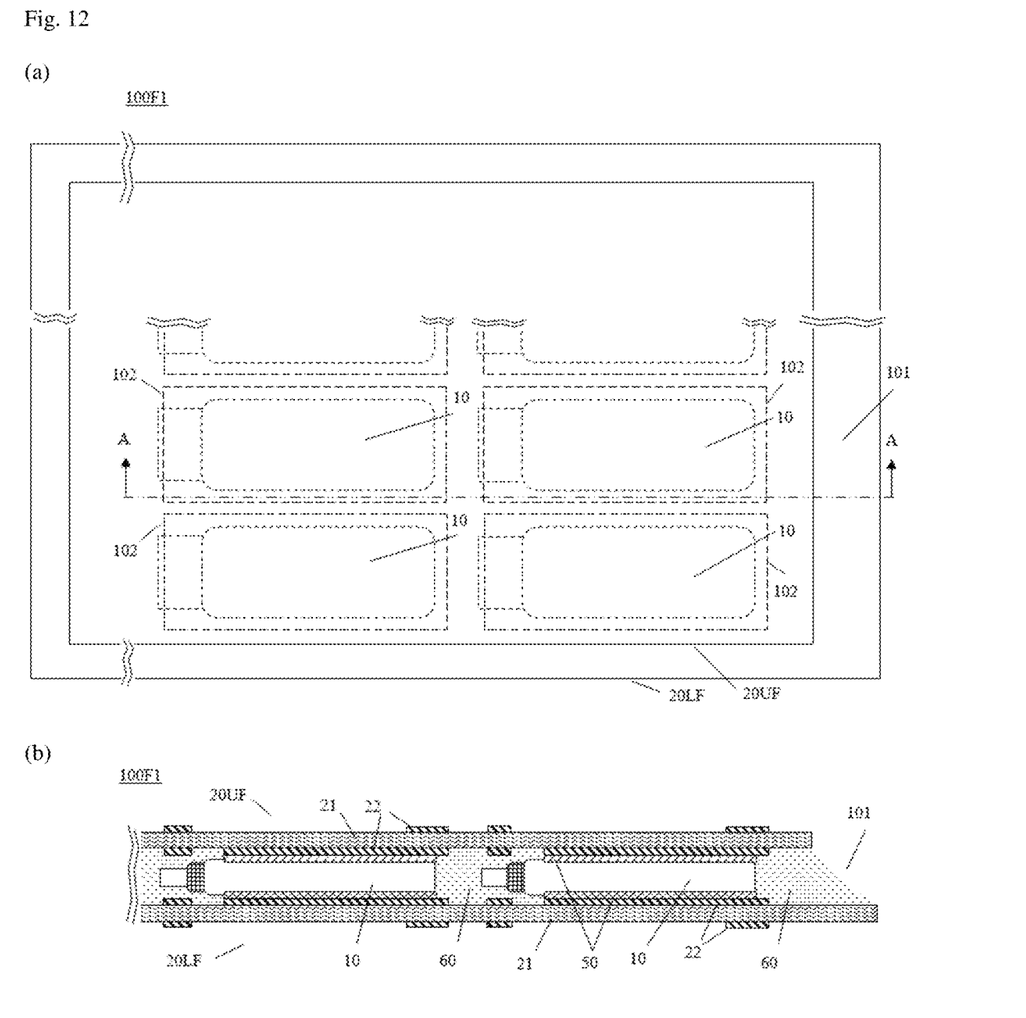

In quantity production, multiple capacitor elements are placed in between two (or more) protective substrates of large area and then the above process is applied over the whole sandwiched assembly. FIG. 12 depicts a preferred intermediate assembly 100F1 used for quantity production in top view (a) and cross-sectional view (b) (at cutting plane A-A of (a)). The capacitor elements 10 are placed in designated locations 102 between the two large area protective substrates. The substrates comprise conductive pads 21 on their surfaces in the designated locations 102 and conductive paste 50 is applied to bond the capacitor elements to these pads.

To package the capacitor elements with insulating material, because each capacitor element is now sandwiched and buried within two large area substrates, it is not possible to apply traditional liquid dispensing encapsulation, which is generally administered over individual, exposed devices. It is also difficult to apply compound molding or transfer molding because, in this case, fluid must be squeezed in through the narrow edge opening of the sandwiched assembly so special molds and sealings and pressurization are needed.

The preferred method to fill insulating material into the gap space between the two large substrates is by capillary filling. The area of the lower substrate 20LF is made larger than the area of the upper substrate 20UF so that a stripe of area 101 along the edges of the lower substrate is exposed when assembly is view from top. The un-cured fluid of the insulating material is dispensed onto and along the stripe of area 101 (for convenience, called the dispensing area) continuously and the fluid will flow into the gap by capillary effect. Preferably, the fluid should be administered at one end of the sandwiched assembly to make the fluid flow from one end to the opposite end. Capillary effect is able to pull the fluid into the narrow gap to fill up a sandwiched assembly of an area of at least 100 mm by 240 mm. The process can be conducted under normal atmospheric pressure with simple fluid dispensing apparatus.

After filling in the insulating materials, the assembly is baked to cure the insulating material. The assembly become a solid piece of a first full-panel intermediate assembly 100F1.

Figure 13:
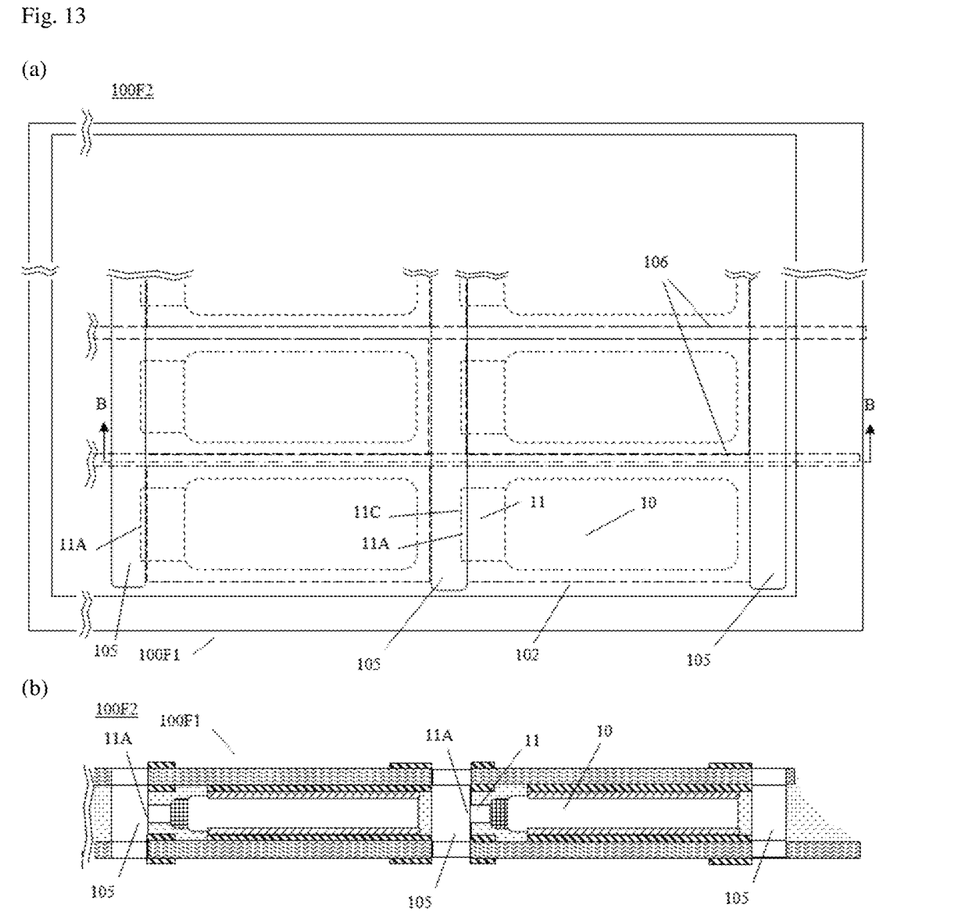

Next, slots 105 are cut on the intermediate assembly 100F1 to expose the anodic ends and the cathodic ends of the capacitor devices, as depicted in FIG. 13 in top view (a) and cross-sectional view (b) (at cutting plane B-B of (a)). At the anodic end, a small portion 11C of the anode 11 is cut off to expose the tip end 11A, so that later steps of metal deposition described earlier can be applied to the freshly cut and planarized end surfaces. This assembly with cut slots becomes a second full-panel intermediate assembly 100F2.

After the formation of external terminals and other necessary procedure, cutting along tracks 106 can separate the intermediate assembly into individual capacitor devices.

Figure 14:
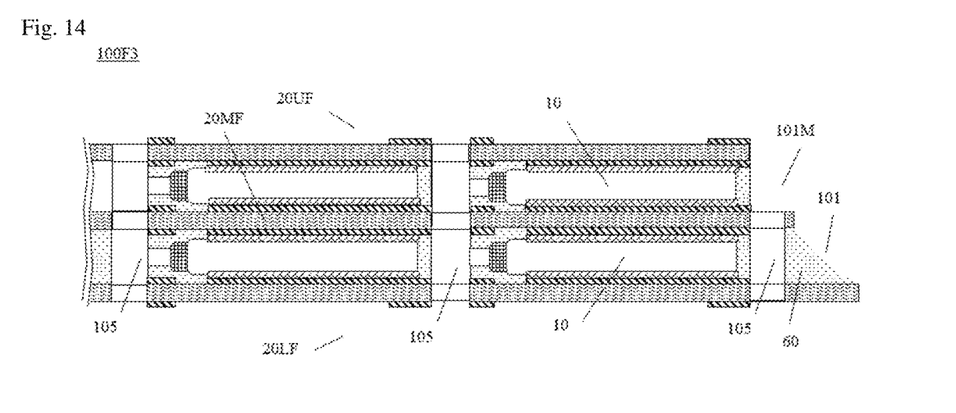
FIG. 14 depicts an example of intermediate assembly comprising 3 large substrates according to the present invention.

When producing capacitor devices containing multiple capacitor elements stacked together with multiple layers of protective substrates, such as in the case of FIG. 7, more than two large substrates can also be sandwiched together to process multiple devices together. FIG. 14 depicts an example of intermediate assembly 100F3 comprising 3 large substrates, 20UF, 20MF and 20LF. Similarly, the top substrates (20UF and 20MF) have smaller areas to allow for the stripe areas near edges to facilitate material dispensing for capillary filling. Cut slots 105 align two ends of stacked capacitor elements. After metal deposition, two stacked capacitor elements are connected together in parallel.

A quantity production example is as follows: Each aluminium electrolytic capacitor element has a dimension of 7.4 mm by 3.7 mm by 0.25 mm thick. The capacitor device is to contain two capacitor elements stacked together and connected in parallel. 3 large PCBs are used as protective substrates to sandwich capacitor elements in two layers in a fashion similar to FIG. 14. The PCBs are all of 3 mil (0.075 mm) thick covered with 1 oz copper clad (conductive pads), which corresponds to a thickness of 1.4 mil (0.035 mm) on each side. The upper protective substrate has a dimension of 230 mm by 110 mm; the middle substrate 230 mm by 108 mm; and the lower protective substrate 240 mm by 125 mm. With these substrate sizes, each layer can contain 506 capacitor elements. After conductive paste bonding, insulating material filling and curing, electrode metal deposition and other processes all performed over the full panel intermediate assemblies on all capacitor elements in batches, sawing separates individual capacitor devices, each having a dimension of 7.3 mm by 4.4 mm by 1.1 mm thick. In comparison, if using conventional lead frame and compound molding packaging, the resulted device has a dimension of 7.3 mm by 4.3 mm by 1.9 mm thick, which is significantly thicker than the product of this invention.

(2) Packaging Based on all-Conductor Protective Substrates

The protective substrates can also be in the form of conductive substrates and pads only, that is, without an insulating substrate body. For example, this all-conductor substrate can be made of thin copper sheets. This packaging can further reduce overall device thickness. Take the construction of a PCB as example. A typical PCB may have a non-conductive core, of glass fiber reinforced epoxy, of thickness 4 to 8 mil (or 0.1 to 0.2 mm) covered with copper clad of 1 oz or even ½ oz, which corresponds to a thickness of 1.4 to 0.7 mil (or 0.035 to 0.018 mm), on each side. By using PCB as the protective substrates, the total thickness of 2 substrates is around 0.27-0.54 mm. On the other hand, if using 0.1 mm copper foil, the total thickness of 2 substrates can be reduced to 0.2 mm. If using copper clad sheets only, the total thickness of 2 sheets can be further reduced to 0.035-0.07 mm.

Figure 15:
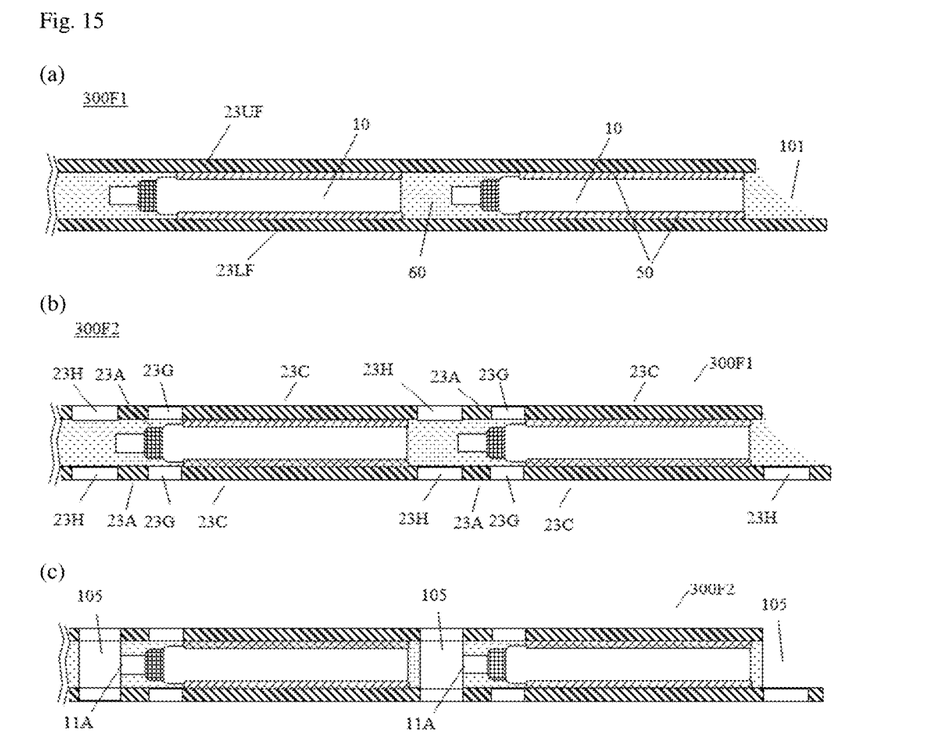

FIG. 15 depicts the procedure and major intermediate assemblies in cross-sectional views in the procedure of quantity production of capacitor devices comprising all-conductor protective substrates. First, multiple capacitor elements 10 are placed in between two conductor sheets 23UF and 23LF and bonded by conductive adhesives 50 to the conductor sheets to form a full panel of sandwiched assembly. Insulating material 60 is then filled into the gap, preferably by capillary filling as described previously, and cured to form an intermediate assembly 300F1 as shown in FIG. 15 (*a*). Next, selected portions 23G and 23H of the conductor sheets are etched away so that individual devices are separated electrically and the remaining conductors form separate anodic and cathodic conductive pads, 23A and 23C, of individual devices. This forms an intermediate assembly 300F2, as shown in FIG. 15 (*b*). After this, similar to the procedure of FIG. 13, slots 105 are cut on the intermediate assembly 300F2 to expose the anodic ends and the cathodic ends of individual capacitor devices, as depicted in FIG. 15 (*c*), so that later steps of metal deposition described earlier can be applied to the freshly cut and planarized end surfaces. This assembly with cut slots becomes a third full-panel intermediate assembly 300F3 for the making of packaging with all-conductor protective substrates. After the formation of external terminals and other necessary procedure, individual capacitor devices are obtained by cutting and separation.

Figure 16:
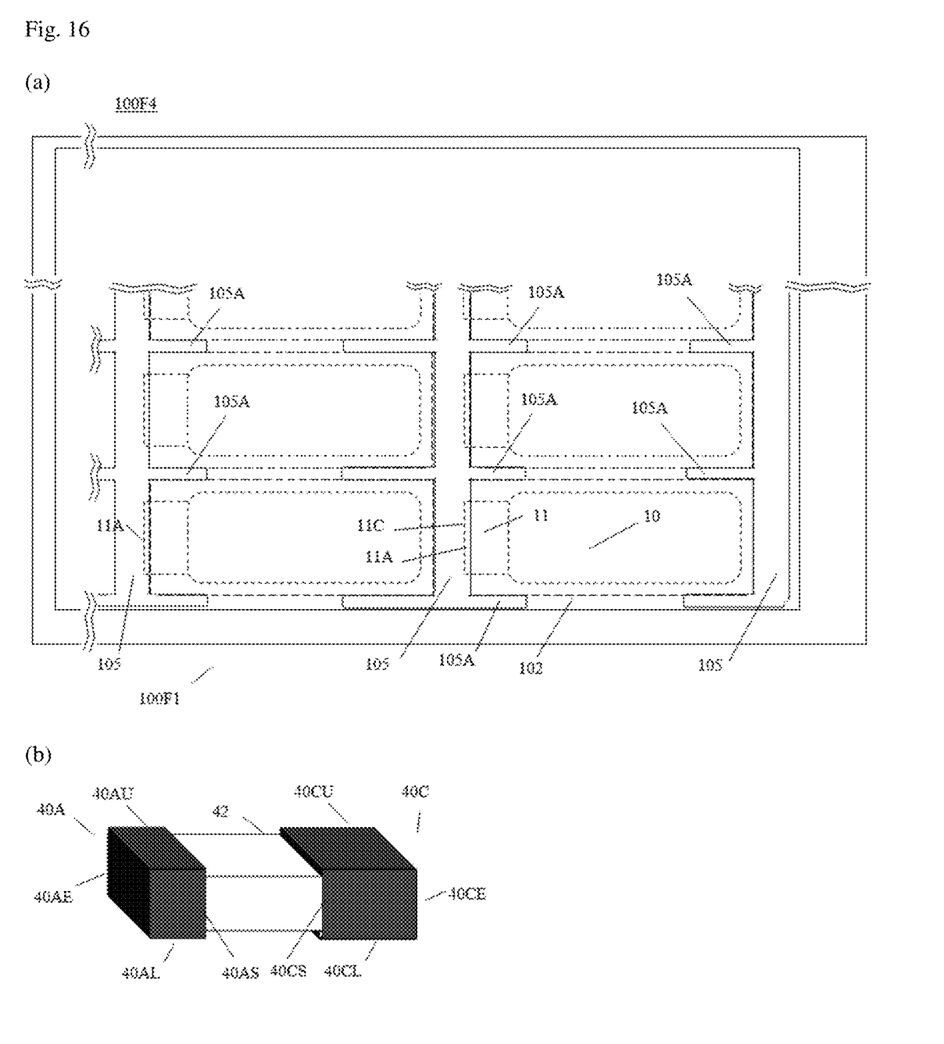

(3) Packaging with External Terminals of Wrap-Around Geometry and Related Intermediate Assembly FIG. 16 (*b*) depicts a packaging similar to the one of FIG. 5 except that each external terminal (40A or 40C) includes metal covering all 5 sides of an end of the device, with additional metal on the sides (40AS or 40CS). This structure wraps metal around the anode and the cathode as pockets and protects the internal structure for improved reliability. FIG. 16 (*a*) depicts an intermediate assembly 100F4 for quantity production of devices with such a packaging in top view. The construction is similar to the intermediate assembly 100F2 of FIG. 13 (*a*) but can also be an assembly of all-conductor protective substrates. The difference is in the geometry of the cut slots. In additional to slots 105, which expose tip faces at the two ends of a device, additional slots 105A are cut to expose parts of two sides of a device near its anodic and cathodic ends so that processes can be applied to the full panel of intermediate assembly to deposit metals to cover and wrap up the two ends of each device.

(4) Solid Tantalum Capacitor Packaging

Above descriptions of the current invention basically uses chip-type aluminium solid electrolytic capacitor as examples. However, the process, capacitor structure and intermediate assembly structure of this invention can also be applied to packaging of other types of electronic devices. One example is tantalum capacitor, or tantalum electrolytic capacitor, which uses a porous tantalum structure as anode, manganese oxide coatings over the surfaces of the pores of the tantalum structure as conductive electrolyte cathode. Usually, a tantalum wire (11T) is sintered to the tantalum structure for anodic external connection and a coating or coatings of carbon and silver adhesive is applied over the surface of the tantalum structure body for cathodic connection (12), as shown in the external view of the capacitor element 10C shown in FIG. 2. Thus, the external structure of a tantalum capacitor element is very similar to that of an aluminium electrolytic capacitor element, with an anode 11T on one end and the body 12 being the cathode. As a result, the process and intermediate assembly structures described in previous paragraphs can also be applied for packaging of tantalum capacitors. A slight difference lies in making electric connection to the tantalum anode. The zinc substitution process for aluminium is not necessary here. A coating of nickel or copper can be deposited by plating or vacuum sputtering or a silver adhesive paste can be applied to make the connection. Alternatively, a conductor piece, such as a piece of copper or nickel can first be welded or mechanically clamped onto the tantalum anode wire and then the coating or plating of copper or nickel can be applied to the conductor piece.

A quantity production example is as follows: Each Tantalum electrolytic capacitor element has a dimension of 7.0 mm by 3.65 mm by 1.0 mm thick. 2 large PCBs are used as protective substrates to sandwich capacitor elements. The PCBs are of 3 mil (0.075 mm) thick covered with 1 oz copper clad (conductive pads), which corresponds to a thickness of 1.4 mil (0.035 mm) on each side. The upper protective substrate has a dimension of 230 mm by 110 mm and the lower protective substrate 240 mm by 125 mm. With these substrate sizes, 506 capacitor elements can be packaged and processed together. After conductive paste bonding, insulating material filling and curing, electrode metal deposition and other processes all performed over the full panel intermediate assemblies on all capacitor elements in batches, sawing separates individual capacitor devices, each having a dimension of 7.3 mm by 4.4 mm by 1.5 mm thick. In comparison, if using conventional lead frame and compound molding packaging, the resulted device has a dimension of 7.3 mm by 4.3 mm by 1.9 mm thick, which is again thicker than the product of this invention.

The present invention disclosed herein has been described by means of specific embodiments and process steps. However, numerous modifications, variations and enhancements can be made thereto by those skilled in the art without departing from the spirit and scope of the disclosure set forth in the claims.

What is claimed is:

1. A method for quantity production of packaging structures of electronic devices including:
   (a) providing a first substrate as a lower substrate, which includes on its upper surface multiple electrically conductive pads at pre-determined positions, each pad pasted with an electrically conductive joining material;
   (b) disposing multiple electronic elements to the pre-determined positions with the joining material covered pads;
   (c) providing a second substrate as an upper substrate, which includes on its lower surface multiple electrically conductive pads at pre-determined positions, each pad pasted with an electrically conductive joining material, and disposing the second substrate over the top of the first substrate such that the multiple electronic elements being disposed in between the upper substrate and the lower substrate while the lower substrate still having an area not covered by the upper substrate on its upper surface as a dispensing area;
   (d) hardening the electrically conductive joining material so that the lower substrate, the upper substrate and the electronic elements in between are joined as a base assembly, which has internal passages that are interconnected and connected to the exposed area as well;
   (e) filling the internal passages with an insulating material from the dispensing area such that the insulating material encompass all the electronic elements in between the upper and the lower substrates;
   (f) hardening the insulating material so that the base assembly and the insulating material are joined together as a first intermediate assembly;
   (g) creating multiple slot openings on the first intermediate assembly by machining such that portions of the conductive pads in the upper and the lower substrates are exposed and thereby obtaining a second intermediate assembly;
   (h) forming an inner metal layer on selected areas on the surface of the second intermediate assembly such that the inner metal layer connects to the conductive pads including the portions exposed in the multiple slot openings and then forming an additional metal layer over the inner metal layer to become external terminals and thereby obtaining a third intermediate assembly;
   (i) cutting the third intermediate assembly and separating it into multiple individual electronic devices.

2. The method of claim 1, the filling of the insulating material including dispensing the insulating material from dispensing area and filling into the internal passages by capillary effect.

3. A method for quantity production of packaging structures of capacitor devices including:
   providing a first substrate as a lower substrate and a second substrate as an upper substrate, each of the two substrates comprising multiple conductive pads on pre-determined positions on its surfaces, the multiple conductive pads comprising electrically separated anodic conductive pads and cathodic conductive pads;
   applying an electrically conductive joining material on each of the conductive pads on the lower surface of the upper substrate and on each of the conductive pads on the upper surface of the lower substrate;
   disposing multiple capacitor elements to the pre-determined positions on top surface of the first substrate, each of the capacitor elements comprising a cathode end and an anode end;
   disposing the second substrate over the top of the first substrate such that the multiple capacitor elements being disposed in between the upper substrate and the lower substrate while the lower substrate still having an exposed area not covered by the upper substrate on its upper surface as a dispensing area;
   hardening the electrically conductive joining material so that the lower substrate, the upper substrate and the capacitor elements in between are joined as a base assembly, thereby the base assembly comprising internal passages that are interconnected and connected to the dispensing area, the cathodic conductive pads being electrically connected to the cathode ends of the capacitor elements;
   filling the internal passages with an insulating material from the dispensing area such that the insulating material encompass all the capacitor elements in between the upper and the lower substrates;
   hardening the insulating material so that the base assembly and the insulating material are joined together as a first intermediate assembly;
   creating multiple slot openings on the first intermediate assembly by machining such that portions of the multiple conductive pads and the anode ends of the capacitor elements are exposed and thereby obtaining a second intermediate assembly;
   forming an inner metal layer on the anode ends of the capacitor elements that are exposed in the multiple slot openings on the surface of the second intermediate assembly, plating copper over the inner metal layer to form anodic external terminals and electrically connecting to the anode ends, plating copper to form cathodic external terminals and electrically connect to the cathodic conductive pads, thereby obtaining a third intermediate assembly;
   cutting the third intermediate assembly and separating it into multiple individual capacitor devices.

4. An intermediate assembly for quantity production of packaging structures of capacitor devices comprising:
   two protective substrates including an upper substrate disposed to cover a lower substrate while leaving a strip of area on the lower substrate uncovered as a dispensing area, each of the two protective substrates comprising electrically separated anodic conductive pads and cathodic conductive pads on predetermined positions on its surfaces;

at least hundreds of capacitor elements disposed in between the upper substrate and the lower substrate and attached to the two substrates by a conductive joining material;

an insulating material filling a gap space in between the two protective substrates and encompassing the capacitor elements such that the two protective substrates and the capacitor elements and the insulating material form a thin solid piece;

each of the capacitor elements comprising an anodic end and a cathodic end;

multiple slot openings cut through the thin solid piece such that parts of the anodic conductive pads and a part of the anodic end of each of the capacitor elements being exposed to the multiple slot openings and the exposed part of the anodic end comprising a metal coating of zinc;

such that the intermediate assembly comprises a number of designated locations with each of the designated locations comprising a number of the at least hundreds of capacitor elements, each of the number of designated locations becoming one of the capacitor devices after metal deposition to form external terminals and cutting to separate individual devices, each of the individual devices having its cathode end electrically connected to the cathodic conductive pads by the conductive joining material and to a cathodic external terminal by the metal deposition of copper plating and its anodic end electrically connected to the anodic conductive pads by an inner metal layer.

5. The intermediate assembly of claim 4, wherein the protective substrates being all-conductor substrates comprising thin copper sheets;

the anodic conductive pads and the cathodic conductive pads being parts of the thin copper sheets electrically separated by selective etching.

6. A packaging structure for a capacitor device comprising:

at least two protective substrates including an upper substrate disposed over a lower substrate, each of the at least two protective substrates comprising electrically separated anodic conductive pads and cathodic conductive pads on predetermined positions on its surfaces;

a first capacitor element disposed in between the upper and the lower substrate at a predetermined position;

an insulating material dispensed by capillary effect filling a space in between the at least two protective substrates and encompassing the first capacitor element such that the at least two protective substrates and the first capacitor element and the insulating material form a thin solid body;

an anodic external terminal at an anodic end of the thin solid body and a cathodic external terminal at a cathodic end of the thin solid body;

the first capacitor element comprising an anode end and a cathode end, the cathodic conductive pads being electrically connected to the cathode end by a conductive joining material and to the cathodic external terminal by copper plating, the anodic conductive pads being electrically connected to the anode end by an inner metal layer and plated copper on the anodic end of the thin solid body.

7. The packaging structure for a capacitor device of claim 6, wherein the at least two protective substrates being all-conductor substrates comprising thin copper sheets;

the cathodic conductive pads and the anodic conductive pads being parts of the thin copper sheets electrically separated by selective etching.

8. The packaging structure for a capacitor device of claim 6, further comprising at least a second capacitor element disposed on top of the first capacitor element and in between the upper and the lower substrates, the anode ends and the cathode ends of the two capacitor elements being connected to the anodic external terminal and the cathodic external terminal respectively.

9. The packaging structure for a capacitor device of claim 8, further comprising a middle substrate disposed among the first capacitor element and the at least the second capacitor element, the middle substrate comprising electrically separated anodic conductive pads that are connected to the anodic external terminal and the cathodic conductive pads that are connected to the cathode ends of the capacitor elements by a conductive joining material.

10. The packaging structure for a capacitor device of claim 8, further comprising the conductive joining material at the upper and lower sides of the anode ends of the first capacitor element and the at least the second capacitor element so that the upper and the lower substrates are both joined to the anode ends for increased structural strength.

11. The packaging structure for a capacitor device of claim 8, wherein the anodic conductive pads including external anodic conductive pads on the upper side of the upper substrate and on the lower side of the lower substrate and the anodic external terminal including copper plating covering the external anodic conductive pads and the surfaces at the anodic end of the thin solid body to form a 5-side end terminal to increase structural strength;

the cathodic conductive pads including external cathodic conductive pads on the upper side of the upper substrate and on the lower side of the lower substrate and the cathodic external terminal including copper plating covering the external cathodic conductive pads and the surfaces at the cathodic end of the thin solid body to form a 5-side end terminal to increase structural strength.

12. The packaging structure for a capacitor device of claim 6, wherein the inner metal layer comprising a nickel plating.

13. The packaging structure for a capacitor device of claim 6, further comprising the conductive joining material at the upper and lower sides of the anode end of the first capacitor element so that the upper and the lower substrates are both joined to the anode end for increased structural strength.

14. The packaging structure for a capacitor device of claim 6, wherein the anodic conductive pads including external anodic conductive pads on the upper side of the upper substrate and on the lower side of the lower substrate and the anodic external terminal including copper plating covering the external anodic conductive pads and the surfaces at the anodic end of the thin solid body to form a 5-side end terminal to increase structural strength;

the cathodic conductive pads including external cathodic conductive pads on the upper side of the upper substrate and on the lower side of the lower substrate and the cathodic external terminal including copper plating covering the external cathodic conductive pads and the surfaces at the cathodic end of the thin solid body to form a 5-side end terminal to increase structural strength.

* * * * *